US011209300B2

(12) United States Patent
Johnson

(10) Patent No.: US 11,209,300 B2
(45) Date of Patent: Dec. 28, 2021

(54) FLUID MONITORING SYSTEM AND METHODS OF USE

(71) Applicant: William Arthur Johnson, Plano, TX (US)

(72) Inventor: William Arthur Johnson, Plano, TX (US)

( * ) Notice: Subject to any disclaimer, the term of this patent is extended or adjusted under 35 U.S.C. 154(b) by 0 days.

(21) Appl. No.: 16/368,169

(22) Filed: Mar. 28, 2019

(65) Prior Publication Data

US 2019/0301913 A1    Oct. 3, 2019

Related U.S. Application Data

(60) Provisional application No. 62/649,902, filed on Mar. 29, 2018.

(51) Int. Cl.
*G01F 9/00* (2006.01)
*G08B 21/18* (2006.01)
*G01F 7/00* (2006.01)

(52) U.S. Cl.
CPC ............... *G01F 9/001* (2013.01); *G01F 7/00* (2013.01); *G08B 21/182* (2013.01)

(58) Field of Classification Search
None
See application file for complete search history.

(56) References Cited

U.S. PATENT DOCUMENTS

| | | | | |
|---|---|---|---|---|
| 3,790,279 A | * | 2/1974 | Skala | G01N 21/53 356/70 |
| 4,177,674 A | * | 12/1979 | Friedenberg | B05B 9/06 222/614 |
| 4,177,675 A | * | 12/1979 | Friedenberg | A01M 7/0089 239/156 |
| 5,056,017 A | * | 10/1991 | McGarvey | B67D 7/08 109/39 |
| 5,377,529 A | * | 1/1995 | Boyd | G01M 3/2807 340/605 |
| 5,511,694 A | * | 4/1996 | Rohm | B67D 1/0872 222/27 |
| 5,562,181 A | * | 10/1996 | Elkin | F01M 11/0458 123/196 R |
| 5,876,610 A | * | 3/1999 | Clack | B01D 35/143 210/282 |
| 5,913,180 A | * | 6/1999 | Ryan | B67D 7/145 702/45 |

(Continued)

*Primary Examiner* — Curtis J King

(57) ABSTRACT

A fluid monitoring system for monitoring a volume of a fluid source. The system includes a flow sensor coupled to a fluid line in hydraulic communication with the fluid source. The system includes a fluid monitor having a unit counter configured to: receive a flow signal from the flow sensor; and transmit a unit signal to a processor based on the flow signal and an adjustable unit value. The processor configured to determine a remaining volume value of the fluid source based on a first volume value and the unit signal. The monitor configured to calibrate the remaining volume value through adjustment of the unit value via a first set of binary rotary switches and adjustment of the first volume value via a second set of binary rotary switches. The system further includes a control panel having a plurality of flow monitors in communication with a plurality of flow sensors.

18 Claims, 8 Drawing Sheets

(56) References Cited

U.S. PATENT DOCUMENTS

| | | | | |
|---|---|---|---|---|
| 5,988,859 | A * | 11/1999 | Kirk | B67D 1/06 222/30 |
| 7,955,797 | B2 * | 6/2011 | McManus | G01F 23/0076 422/62 |
| 10,752,489 | B1 * | 8/2020 | Alger | B67D 1/0841 |
| 2001/0032830 | A1 * | 10/2001 | McCormick | G01F 9/00 219/86.31 |
| 2003/0172745 | A1 * | 9/2003 | Mitchinson | G01F 1/34 73/861.49 |
| 2003/0233885 | A1 * | 12/2003 | Bird | G01F 1/115 73/861 |
| 2004/0099688 | A1 * | 5/2004 | Davis | B67D 1/0037 222/145.1 |
| 2004/0103893 | A1 * | 6/2004 | Payne | A61M 11/00 128/202.22 |
| 2004/0129089 | A1 * | 7/2004 | Woodward | G01F 1/363 73/861.52 |
| 2005/0001628 | A1 * | 1/2005 | Jones | H01M 6/505 324/432 |
| 2005/0011282 | A1 * | 1/2005 | Voege | G01P 13/0013 73/861.44 |
| 2005/0072226 | A1 * | 4/2005 | Pappas | G01F 23/2962 73/290 V |
| 2005/0209585 | A1 * | 9/2005 | Nord | G01F 3/38 604/540 |
| 2005/0241391 | A1 * | 11/2005 | Kull | G01F 23/72 73/313 |
| 2006/0042376 | A1 * | 3/2006 | Reusche | G01F 23/2962 73/304 C |
| 2006/0157515 | A1 * | 7/2006 | Oswald | B67D 1/07 222/399 |
| 2007/0056368 | A1 * | 3/2007 | Schneiter | G01G 23/3728 73/296 |
| 2007/0062277 | A1 * | 3/2007 | Miller | G01F 23/02 73/428 |
| 2007/0125162 | A1 * | 6/2007 | Ghazi | G01F 23/292 73/149 |
| 2007/0180903 | A1 * | 8/2007 | Gao | G01F 23/2968 73/290 V |
| 2008/0060962 | A1 * | 3/2008 | Gibson | A47G 23/16 206/459.5 |
| 2009/0093774 | A1 * | 4/2009 | Wang | G01F 1/40 604/247 |
| 2009/0106891 | A1 * | 4/2009 | Klicpera | G01F 15/075 4/605 |
| 2009/0187356 | A1 * | 7/2009 | Artiuch | G01F 25/0007 702/45 |
| 2009/0314080 | A1 * | 12/2009 | Qu | G01F 23/296 73/290 V |
| 2010/0006599 | A1 * | 1/2010 | Cebulski | G01F 1/00 222/71 |
| 2010/0060512 | A1 * | 3/2010 | Garrod | G01F 1/002 342/124 |
| 2011/0012592 | A1 * | 1/2011 | Paradise | G01F 23/68 324/207.16 |
| 2011/0203364 | A1 * | 8/2011 | Staake | G01F 1/115 73/198 |
| 2012/0227473 | A1 * | 9/2012 | Sinha | G01F 1/7082 73/61.75 |
| 2012/0293332 | A1 * | 11/2012 | Rosenfeld | A47J 41/0094 340/584 |
| 2013/0015956 | A1 * | 1/2013 | Wegelin | G06Q 10/06 340/10.1 |
| 2014/0372045 | A1 * | 12/2014 | Keski-Pukkila | A61B 5/6887 702/19 |
| 2015/0019108 | A1 * | 1/2015 | Hendrickson | F01N 11/00 701/102 |
| 2015/0334079 | A1 * | 11/2015 | Laidlaw | H04W 4/60 340/539.11 |
| 2016/0355389 | A1 * | 12/2016 | Bursey | B67D 1/0884 |
| 2017/0061727 | A1 * | 3/2017 | Savaete | G06Q 20/14 |
| 2017/0068257 | A1 * | 3/2017 | Quinones | G01M 5/00 |
| 2017/0184417 | A1 * | 6/2017 | Pedreiro | G01D 4/002 |
| 2018/0188099 | A1 * | 7/2018 | McCoy | B67D 1/00 |
| 2018/0200431 | A1 * | 7/2018 | Nackaerts | G01F 15/0755 |
| 2018/0273370 | A1 * | 9/2018 | Raguzin | B67D 1/0406 |
| 2018/0325296 | A1 * | 11/2018 | Lavi | A47G 19/2227 |
| 2019/0071298 | A1 * | 3/2019 | Tomforde | G06K 7/1417 |
| 2019/0145812 | A1 * | 5/2019 | Barrett | C12H 1/22 73/304 C |
| 2020/0033174 | A1 * | 1/2020 | Nogueira | G01F 1/74 |
| 2020/0122993 | A1 * | 4/2020 | De Zulueta | G01G 17/04 |

\* cited by examiner

FLUID MONITORING SYSTEM AND METHODS OF USE

CROSS-REFERENCE TO RELATED APPLICATIONS

This application claims priority to Provisional Patent Application No. 62/649,902, filed Mar. 29, 2018, titled DRAFT BEER MONITORING SYSTEM THAT USES BINARY CODED ROTARY SWITCHES TO INPUT DATA IN LIEU OF A MORE COMPLEX SOFTWARE OR FIRMWARE PROGRAM, which is hereby incorporated by reference in its entirety.

BACKGROUND

1. Field of the Disclosed Subject Matter

The disclosed subject matter relates generally to a fluid monitoring system and method of use and more particularly, but not exclusively, to beverage monitoring system and method of use.

2. Background

Existing draft beer systems suffer from maintenance problems when a pressurized beer container e.g., a keg, runs empty. Pressurized air from an empty container enters a beer line resulting in foaming at a tap and waste of beer required to re-prime the beer line. Fluid monitoring systems have been developed in an attempt to solve the problem by notifying the user when the pressurized container is empty, thus prompting the user to change the container before air enters the line. However, conventional monitoring systems suffer from inaccuracy, complexity and costs. One such conventional system uses mechanical scales to estimate when a beer keg is about to run dry, but such a system suffers from inaccuracy because empty beer kegs do not weigh the same, resulting in errors of a gallon or more causing lost sales and increased maintenance costs. Other conventional systems include software-based systems that estimate when a beer keg is about to run dry by number of beers sold. Such systems typically comprise complicated calibration systems along with custom point-of-sale software requiring significant capital investment, ongoing licensing fees, and IT staffing requirements. Even then, the number of beers sold is not an accurate estimate of beers actually dispensed as beers may not have been rung up or otherwise accounted for by the point-of-sale system.

Accordingly, there is a need for a system to accurately monitor fluid flow. There is further a need for such a system to be simple to calibrate and implement. The disclosed subject matter addresses these shortfalls by providing an accurate fluid monitoring system with a simple means of calibration.

SUMMARY

The disclosed subject matter is directed towards a fluid monitor, a fluid monitoring system, and methods of use for accurate determination of a remaining volume of fluid of a fluid source. The fluid monitor, a fluid monitoring system, and methods are applied to a single fluid source or multiple fluid sources, depending on an operating environment. In an embodiment, a fluid monitor having the features of the present invention comprises a unit counter configured to transmit a unit signal based on a flow signal and unit value; a processor configured to: receive the unit signal from the unit counter; and determine a remaining volume value of a fluid source based on the unit signal and a first volume value; and a display module configured to display the remaining unit volume. In another embodiment, the fluid monitor comprises a flow sensor configured to transmit the flow signal proportional to a flow rate of the fluid. In another embodiment, the flow signal comprises an electrical pulse transmitted at a rate proportional to the flow rate of the fluid. In another embodiment, the fluid monitor comprises a unit selection module configured to adjust the unit value. The unit selection module comprises, in some embodiments, a first set of binary rotary switches configured to allow for manual adjustment of the unit value.

In another embodiment, the fluid monitor comprises a volume selection module configured to adjust one of the first volume value or a low volume value. The volume selection module comprises, in some embodiments, a second set of binary rotary switches configured to allow for manual adjustment of the first volume value and the low volume value.

In another embodiment, the fluid monitor comprises an alarm module configured to trigger a low alarm when the remaining volume value is less than or equal to the low volume value; the alarm module further configured to trigger a major alarm when the remaining volume value is zero.

In another embodiment, the processor is configured to determine the remaining volume value based on the equation:

$$V_r = V_1 - \left(\frac{P}{U}\right);$$

wherein $V_r$ is the remaining volume value; $V_1$ is the first volume value; P is a number of electrical pulses associated with the flow signal; and U is the unit value.

In an embodiment, a fluid monitoring system having the features of the present invention comprises: a flow sensor hydraulically connected to a fluid line; the flow sensor configured to transmit a plurality of electrical pulses proportional to a flow rate in the fluid line; the fluid line in hydraulic communication with a fluid source; a fluid monitor, comprising: a unit counter in communication with the flow sensor; the unit counter having a first set of binary rotary switches; the unit counter configured to: receive the plurality of electrical pulses from the flow sensor; receive a unit value from the first set of binary rotary switches; and transmit a unit signal based on the plurality of electrical pulses and the unit value; a processor having a second set of binary rotary switches; the processor configured to: receive the unit signal from the unit counter; receive a first volume value from the second set of binary rotary switches; determine a remaining volume value of the fluid based on the unit signal and the first volume value; transmit a display signal associated with the remaining volume value; receive a low volume value from the second set of binary rotary switches; and trigger a low alarm when the remaining volume value equals the low volume value; trigger a major alarm when the remaining unit value is zero; a display configured to receive the display signal and display the remaining volume value; and an enclosure housing the fluid monitor; and an uninterrupted power system configured to power the fluid monitor.

In an embodiment, a fluid monitoring system having the features of the present invention comprises: a control panel having a power source; a plurality of fluid monitors connected to the control panel; wherein each of the plurality of fluid monitors configured to receive one of a plurality of flow signals from one of a plurality of flow sensors; each of the plurality of fluid monitors comprising: a unit counter configured to transmit a unit signal based on one of the plurality of flow signals and a unit value; a processor configured to: receive the unit signal from the unit counter; and determine a remaining volume value based on the unit signal and a first volume value; and a display module configured to display the remaining volume value; and a blanking logic module configured to control power consumption of the plurality of fluid monitors. The blanking logic, in some embodiments, turns off power to the display module.

In another embodiment, the fluid monitoring system comprises an alarm logic module responsive to at least one of a plurality of alarms associated with the plurality of fluid monitors. In still another embodiment, the power source comprises an uninterrupted power supply. In another embodiment, the fluid monitoring system comprises a plurality of flow sensors; wherein each of the plurality of flow sensors is configured to communicate a flow signal to the unit counter of the one of a plurality of fluid monitors.

An embodiment of a method of monitoring a fluid includes: coupling a flow input source to a fluid line; the fluid line in hydraulic communication with a fluid source having a first volume; providing a fluid monitor configured to: monitor a flow signal from the flow input source; determine a remaining volume value associated with the fluid source based on a first volume value associated with the first volume of the fluid source, the flow signal, and a first unit value; display the remaining volume value; and trigger an alarm based on the remaining volume value and a predetermined alarm value; imparting a flow of fluid from the fluid source through the fluid line; whereby the flow input source emits the flow signal to the fluid monitor; and using the fluid monitor to determine the remaining volume value associated with the fluid source; whereby the remaining volume value is displayed; and whereby the alarm is triggered when the remaining volume value equals the predetermined alarm value.

In another embodiment, the method includes the steps of monitoring the remaining volume value; determining a remaining volume of the fluid source when the remaining volume value is zero; and adjusting the first unit value to a second unit value; whereby a difference between the remaining volume value and the remaining volume is reduced.

In another embodiment, the method includes the steps of adjusting a first set of binary rotary switches associated with the first unit value and the second unit value; and adjusting a second set of binary rotary switches associated with the first volume value and the predetermined alarm value.

In another embodiment of the method, of the alarm comprises at least one of a low alarm and a major alarm.

An objective of the fluid monitor, fluid monitoring system, and methods is to provide a reliable and accurate fluid monitor and fluid monitoring system. Another objective of the fluid monitor, fluid monitoring system, and methods is to provide an improved means of calibrating the fluid monitor and system.

BRIEF DESCRIPTION OF THE DRAWINGS

The drawings constitute a part of this specification and include exemplary embodiments of the disclosed subject matter and illustrate various objects and features thereof.

DETAILED DESCRIPTION

Figure 1:
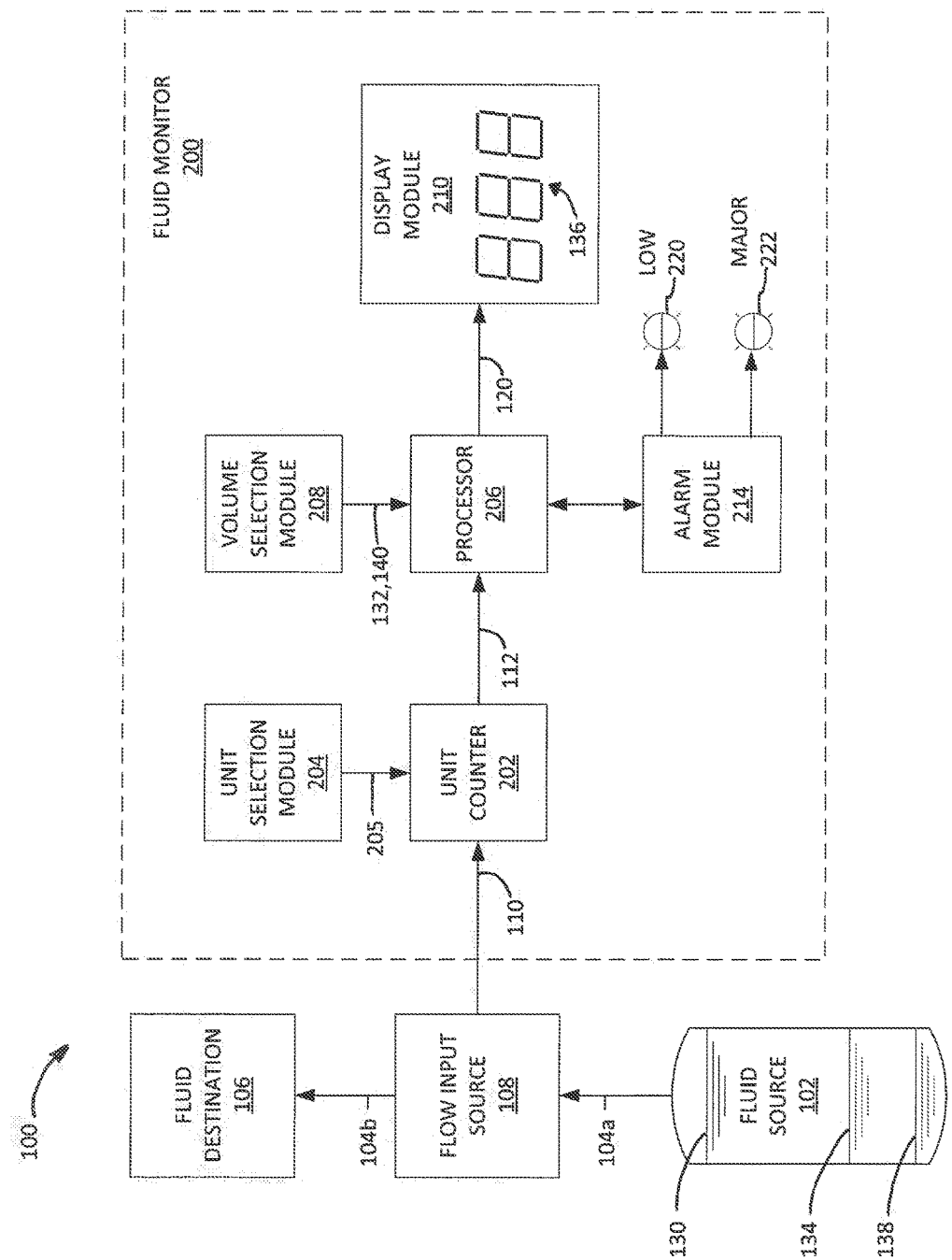
FIG. 1 is a schematic view of an embodiment of the disclosed subject matter and a portion of its operating environment.

Detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

The detailed description includes the disclosure of numerical ranges. Numerical ranges should be construed to provide literal support for claim limitations reciting only the upper value of a numerical range, and provide literal support for claim limitations reciting only the lower value of a numerical range.

Although the invention has been disclosed with reference to various particular embodiments, it is understood that equivalents may be employed and substitutions made herein without departing from the scope of the invention as recited in the claims.

It is to be understood that while certain aspects of the disclosed subject matter have been shown and described, the disclosed subject matter is not limited thereto and encompasses various other embodiments and aspects.

The disclosed subject matter will now be described with reference to the drawing figures, in which like reference numerals refer to like parts throughout. For purposes of clarity in illustrating the characteristics of the present disclosed subject matter, proportional relationships of the elements have not been maintained in the figures. In some cases, the sizes of certain small components have been exaggerated for illustration.

Referring to FIG. 1, illustrates one embodiment of the basic environment in which the fluid monitoring system 100 operates. This environment includes a fluid monitor 200 to determine a remaining volume value 136 associated with a remaining volume 134 of a fluid source 102. The fluid source 102 initially comprises a first volume 130. The fluid source 102 is hydraulically connected to a fluid destination 106 via at least fluid lines 104a,b. In an embodiment, the fluid flows from the fluid source 102 to the fluid destination 106 via the fluid lines 104a,b. In some embodiments, the fluid source 102 is a beverage container, such as a keg; and the fluid destination is a beverage tap, wherein the beverage tap controls the flow of the fluid through the fluid lines 104a,b.

It is understood that any type of fluid contained within in any type of container may be monitored with the fluid monitoring system 100. The complete system is hardwired, stand-alone, and operates independent of any local or hosted server, wireless network, or the Internet. The invention is autonomous: it requires no connection to the internet, servers, displays, or smart devices such as phones or tablets to operate.

In an embodiment, a flow input source 108 is coupled between the fluid lines 104a,b in order to sense the flow of fluid between the fluid source 102 and fluid destination 106. Any number of piping components such as, pumps, isolation valves, tees and/or branches may be installed along the fluid lines 104a,b; provided that flow is not diverted between the fluid source 102 and the flow input source 108 while monitoring the fluid. The flow input source 108 is configured to sense a flow rate of the fluid in the fluid lines 104a,b, and transmit a flow signal 110 proportional to the flow rate of the fluid to the fluid monitor 200 via a hardwired or wireless connection. In an embodiment of the disclosed subject matter, the flow input source 108 comprises a flow sensor configured to transmit an electrical pulse at a rate proportional to the volume of fluid flowing through the fluid lines 104a,b. In an embodiment, the flow sensor comprises a Digmesa® flow sensor, model FHKUC. A remaining volume value ($V_r$) may be calculated at any given time in accordance to the following formula:

$$V_r = V_1 - \left(\frac{P}{U}\right); \quad \text{(Equation 1)}$$

where $V_r$ is a remaining volume value; $V_1$ is the first volume value; P is the number of digital pulses; U is a unit value.

For example, if $V_1$ is 124 pints (the full volume of a standard keg of beer), P is 228 pulses, and U is 114 pulses per pint (ppp), then $V_r$=124−(228/114)=122 pints. The accuracy of the system 100 can determined by verifying how much fluid remains in the fluid source 102 when $V_r$=0. Continuing the example above, if 3 pints remain in a 124-pint fluid source when $V_r$=0, the overall system error is 2.4% (3 pts./124 pts.). The accuracy of the system 100 is improved by increasing the unit value (U) to more accurately determine the actual remaining volume of fluid. In some embodiments, it is desirable for a small volume of fluid to remain in the fluid source 102 when $V_r$=0 in order to avoid air entering the fluid lines 104a,b resulting in foaming, or blow out, at the fluid destination 106. For example, if the unit value (U) is increased from 114 ppp to 116 ppp, then an additional 248 pulses will be emitted over the total volume of the fluid source (2 ppp×124 pints=248 pulses). The additional 248 pulses are the equivalent of 2.18 pints (248 pulses/114 ppp), resulting in a new error of 0.66% ((3 pts.−2.18 pts.)/124 pts.). The adjustment of the unit value (U) from 114 ppp to 116 ppp results in an actual remaining volume of 0.82 pints (3 pts.−2.18 pts.) in the fluid source 102 when $V_r$=0. This accomplishes the desirable objectives of not completely emptying the fluid source 102 in order to avoid entry of air into the fluid lines 104a,b and a significant increase in monitoring accuracy.

In an embodiment of the disclosed subject matter, a fluid monitor 200 comprises a unit counter 202, a processor 206, and a display module 210. The unit counter 202 is configured to receive the flow signal 110, and transmit a unit signal 112 based on the unit value. For example, if the unit value (U) is the number "114", the unit counter 202 emits a unit signal 112 for every 114 electrical pulses received from the flow input source 108. The unit selection module 204 is configured to allow a user to manually adjust and load the unit value 205 to the unit counter 202 via a unit selection module 204 in order to calibrate the system 100. In an embodiment, the unit counter 202 comprises a digital high-speed presettable unit counter, and the processor 206 comprises a digital low-speed presettable down counter.

In an embodiment of the disclosed subject matter, the processor 206 is configured to: receive the unit signal 112 from the unit counter 202; and determine a remaining volume value 136 of the fluid source 102 based on the unit signal 112 and a first volume value 132. A volume selection module 208 is configured to allow a user to manually adjust and transmit the first volume value 132 to the processor 206. The volume selection module 208 is further configured to adjust and transmit a low volume value 140 associated with the low volume 138 of the fluid source 102. In an embodiment, the processor 206 is further configured to transmit a display signal 120 to a display module 210; the display signal 120 associated with the remaining volume value 136. The display module 210 is configured to display the remaining volume value 136. In some embodiments, the display module 210 comprises a plurality of seven-segment displays responsive to the display signal 120.

In an embodiment, the fluid monitor 200 further comprises an alarm module 214 in electrical communication with the processor 206. The alarm module 214 configured to trigger a low alarm 220 when the remaining volume value 136 is less than the low volume value 140, and a major alarm 222 when $V_r$=0. In some embodiments, the low alarm 220 and the major alarm 222 each comprise a light emitting diode. In alternate embodiments, an audible alarm is provided.

Figure 2:
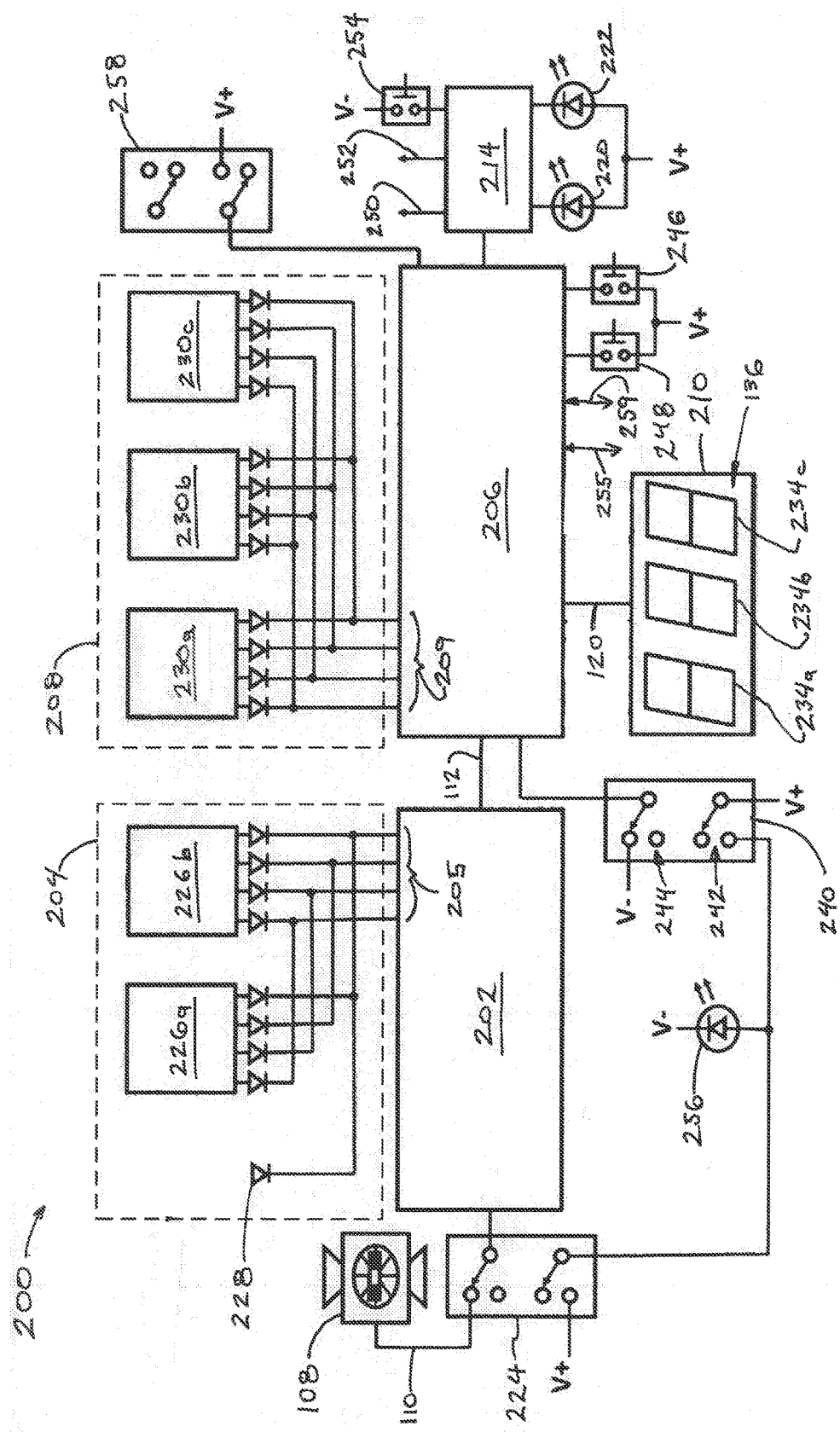
FIG. 2 is a schematic view of an embodiment of the disclosed subject matter.

Referring to FIG. 2, an embodiment of the disclosed subject matter is illustrated by block diagram of the fluid monitor 200 and operating environment. A flow signal 110 is transmitted from the flow input source 108 through a push-to-clean switch 224 to the unit counter 202. The flow signal 112 may comprise a series of electrical pulses proportional the flow rate of the fluid being sensed by the flow input source 108. The unit counter 202 comprises a binary counter configured to receive the flow signal 110 and count the number of electrical pulses from the flow signal 110.

In an embodiment, the unit selection module 204 comprises a diode 228 and a first set of binary rotary switches 226a,b, collectively configured to transmit a unit value 205 to the unit counter 202. The diode 228 is preconfigured to transmit a binary value of "1" representing the hundredth value of a three digit number, and the first set of binary rotary switches 226a,b are configured to transmit a numerical value of 0 and 99, resulting in a unit value 205 between 100 and 199. The unit selection module 204 is configured to transmit the unit value 205 to the unit counter 202. The unit counter 202 is further configured to transmit one electrical pulse in the form of a unit signal 112 to the processor 206 each time the number of electrical pulses equals the unit value 205. For example, if the unit value corresponds to the numerical value of 114, then the unit counter 202 transmits the unit signal 112 to the processor 206 each time 114 electrical pulses from the flow input source 108 are counted by the unit counter 202. The unit signal 112 may comprise a single electrical pulse.

In an embodiment, the volume selection module 208 is configured to transmit a volume value 209 to the processor 206. The volume selection module 208 comprises a second set of binary rotary switches 230a,b,c configured to transmit a volume value 209 between 0 and 999 to the processor 206. The volume value 209 comprises one of a first volume value 132 and a low volume value 240 (shown in FIG. 1); the first volume value 132 associated with the first volume 130 of the fluid source 102; the low volume value 140 associated with the low volume 138 of the fluid source 102. The processor 206 is configured to determine a remaining volume value 136 by counting down from the first volume value 132 based on the unit signal 112 received from the unit counter 202. The processor 206 transmits the remaining volume value 136 to the display module 120 via the display signal 120.

In an embodiment, the display module 210 is configured to display the remaining volume value 136. The display module 210 comprises a plurality of seven-segment LED displays 234a,b,c configured to display a number between 0 and 999. In other embodiment, the display module 210 comprises a LCD screen or touch screen.

In an embodiment, the fluid monitor 200 comprises an alarm module 214 in electrical communication with the processor 206; the alarm module 214 configured to trigger a low alarm when the remaining volume value 136 equals, or is less than, the low volume value 140. The low alarm comprises a first light 220 and a low alarm signal 250; the first light 220 configured to illuminate when the low alarm is triggered; the low alarm signal 250 is transmitted from the alarm module 214 to a low alarm logic module 422 (shown on FIG. 4) when the low alarm is triggered.

In another embodiment, the alarm module 214 is configured to trigger a major alarm when the remaining volume value 136 is zero ($V_r=0$). The major alarm comprises a second light 222 and major alarm signal 252; the second light 222 configured to illuminate when the major alarm is triggered; the major alarm signal 252 is transmitted from the alarm module 214 to the major alarm logic module 424 (shown on FIG. 4) when the major alarm is triggered. In an embodiment, an alarm reset 254 is in electrical communication with the alarm module 214; the alarm reset 254 is configured to reset the alarm module 214, and associated low alarm and major alarm. In an embodiment, the alarm reset 254 is a push button.

In an embodiment of the disclosed subject matter, the fluid monitor 200 comprises a programming switch 240 having a normal/off normal alarm position 242 and run/load position 244, wherein the run/load position 244 comprising a run state and a load state; and a first load switch 246, each of the programming switch 240 and the first load switch 246 are configured to load the first volume value 132 (shown as volume value 209) into the processor 206 through sequential operation. For example, a method of loading the first volume value 132 to the processor 206 comprises the steps of: adjusting the second set of binary rotary switches 230a,b,c; setting the programming switch 240 to the load state of the run/load position 244; activating the first load switch 246; whereby the first volume value 132 is transmitted to the processor 206 from the volume selection module 208; and setting the programming switch 240 to the run state of the run/load position 244, whereby the first volume value 132 is saved to processor 206 and the normal/off normal alarm position 242 is set from an off normal state to a normal state. In an embodiment, the programming switch 240 comprises a two-way selectable switch, and the first load switch 246 comprises a push button switch.

In another embodiment of the disclosed subject matter, the fluid monitor 200 comprises a second load switch 248 configured to load the low volume value 140 (shown as volume value 209) into the processor 206, and load the unit value 205 into the unit counter 202, through sequential operation with the programming switch 240. For example, a method of loading the low volume value 140 into the processor 206 and the unit value 205 into the unit counter 202 comprises the steps of: adjusting the first set of binary rotary switches 226a,b to a unit value 205; adjusting the second set of binary rotary switches 230a,b,c to a low volume value 140; setting the programming switch 240 to the load state of the run/load position 244; activating the second load switch 248; whereby the unit value 205 is transmitted to the unit counter 202, and whereby the low volume value 140 is transmitted to the processor 206; and setting the programming switch 240 to the run state of the run/load position 244, whereby the low volume value 140 is saved to processor 206 and the normal/off normal alarm position 242 is set from the off normal state to the normal state. In an embodiment, the second load switch 248 comprises a push button switch.

In another embodiment of the disclosed subject matter, the fluid monitor 200 is configured to trigger a first off-normal LED 256 and transmit an off-normal alarm signal 255 to the off-normal alarm logic module 430 (shown on FIG. 4) when the push-to-clean switch 224 or the programming switch 240 is left in an off-normal position, i.e. the programming switch 240 remains in the load state of the run/load position 244.

In another embodiment of the disclosed subject matter, the fluid monitor 200 comprises a blanking switch 258 connected to the processor 206 via a control lead 259; the blanking switch 258 configured to "blank," or turn off, the display module 210 when activated; thereby reducing the power consumption of the display module 210. The current of the display module 210 is significantly reduced when the blanking switch 258 is activated. In some embodiments, the current of the fluid monitor 200 is reduced by more than 50 percent.

In some embodiments not illustrated in the Figures, hardwired leads between components of the fluid monitoring system 100 and fluid monitor 200 are replaced by a wireless module attached, for example, to the flow input source 108 and a wireless receiver is used by the fluid monitor 200 to monitor the flow signal 110.

Figure 3:
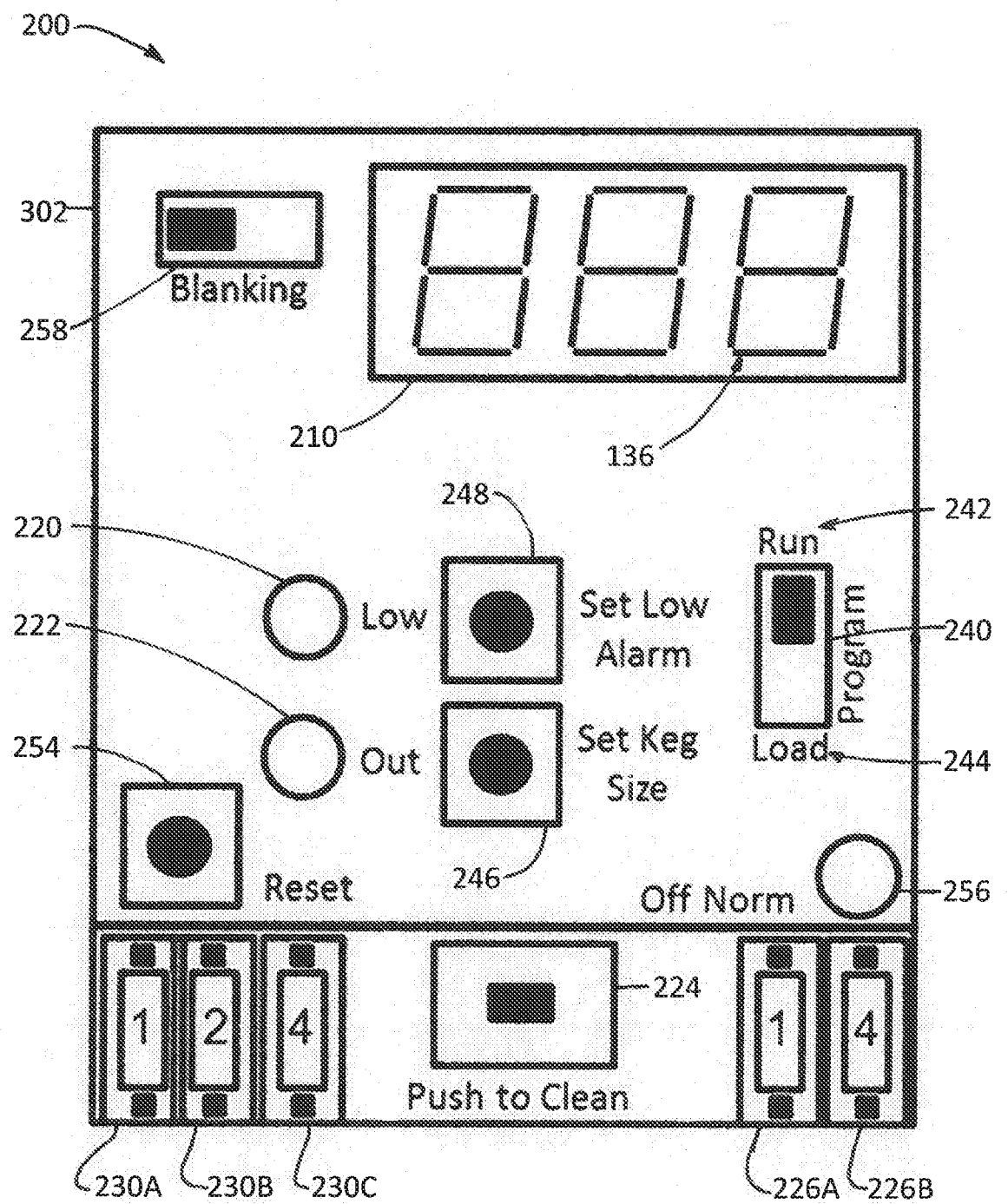
FIG. 3 is a pictorial view of an embodiment of the disclosed subject matter.

In an embodiment of the disclosed subject matter, and referring to FIG. 3, the certain components of the fluid monitor, as illustrated in FIG. 2, are arranged on a front face 302 of the fluid monitor 200.

Figure 4:
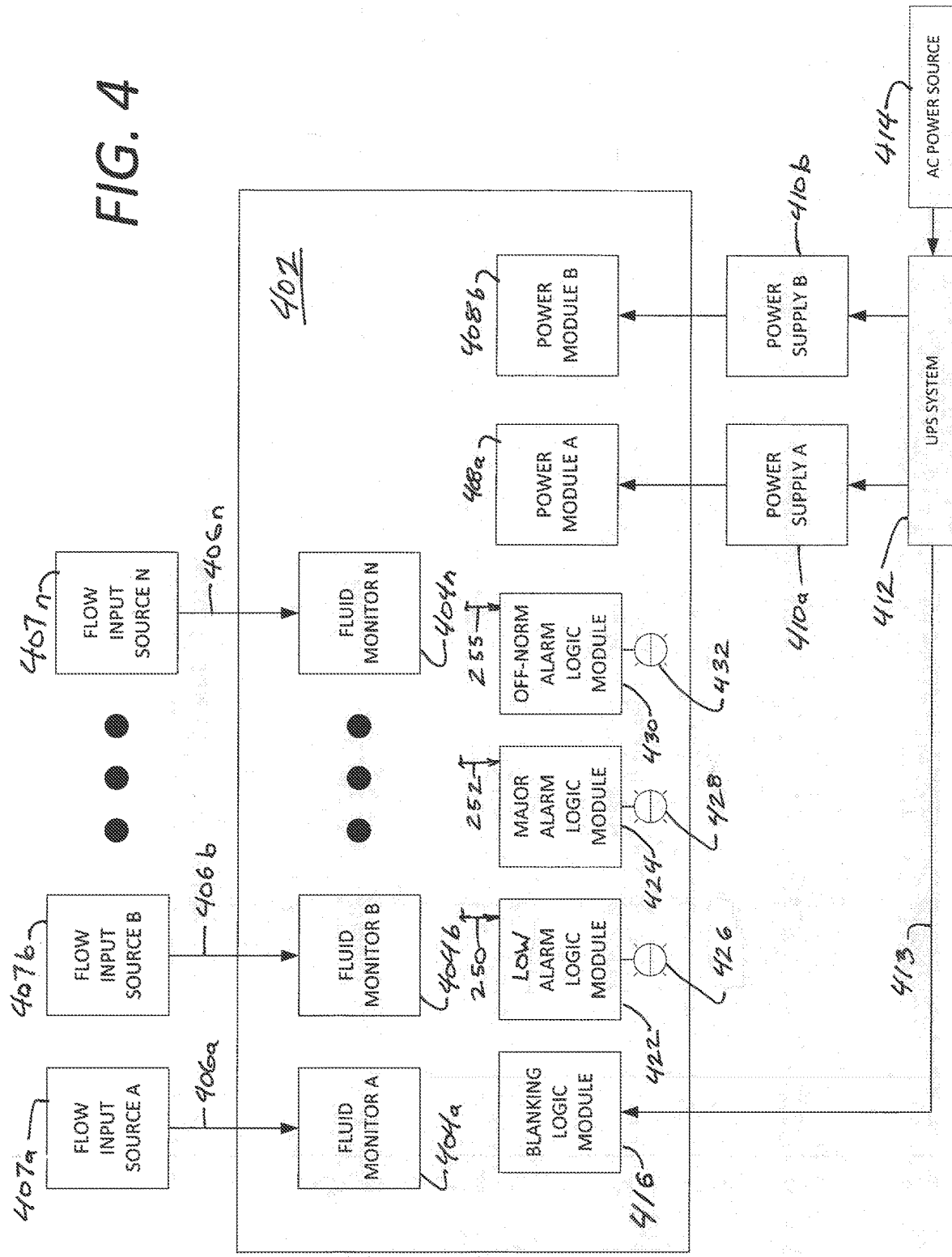
FIG. 4 is a schematic view of an embodiment of the disclosed subject matter and a portion of its operating environment.

Referring now to FIG. 4, in an embodiment of the disclosed subject matter, a monitor assembly 402 comprising a plurality of fluid monitors 404a-n; each of the plurality of fluid monitors 404a-n are configured to monitor one of a plurality of flow signals 406a-n in the same manner as the fluid monitor 200 in FIGS. 1-3. In this configuration, a plurality of flow input sources 407a-n may be monitored simultaneously.

The monitor assembly 402 further comprises redundant power modules 408a-b; each of the power modules 408a,b electrically connected to separate 12-volt DC power supplies 410a,b for electrical reliability of the monitor assembly 402. The power modules 408a,b are electrically configured to power all the components for the monitor assembly 402, including the plurality of fluid monitors 404a-n. In an embodiment, the power supplies 410a,b are each electrically connected to an uninterrupted power system 412 having batteries to provide back-up power to the monitor assembly 402 in the event of power loss from an AC power source 414.

In an embodiment, the monitor assembly 402 further comprises a blanking logic module 416 electrically connected to the uninterrupted power system 412; the blanking logic 416 configured to extinguish, or turn off, the display 210 (not shown) on each of the plurality of fluid monitors 404a-n when the uninterrupted power supply 412 emits a loss of power alarm 413. By extinguishing the displays 210 of the fluid monitors 404a-n, the overall power consumption of the monitor assembly 402 is significantly reduced. In some embodiments, the power consumption of the monitor assembly 402 is reduced by at least a factor of ten.

In an embodiment, the monitor assembly 402 further comprises a low alarm logic module 422 configured to receive the low alarm signal 250 from each of the plurality of fluid monitors 404a-n; the low alarm logic module 422 configured to trigger a second low alarm 426 when any of the plurality of fluid monitors 404a-n emits the low alarm signal 250.

In an embodiment, the monitor assembly 402 further comprises a major alarm logic module 424 configured to receive the major alarm signal 252 from each of the plurality of fluid monitors 404a-n; the major alarm logic module 424 is configured to trigger a second major alarm 428 when any of the plurality of fluid monitors 404a-n emits the major alarm signal 252.

In an embodiment, the monitor assembly 402 further comprises an off-normal alarm logic module 430 configured to receive the off-normal alarm signal 255 from each of the plurality of fluid monitors 404a-n; the off-normal alarm logic module 430 configured to trigger a second off-normal LED 432 to illuminate when any of the plurality of fluid monitors 404a-n emits the off-normal alarm signal 255.

Methods of Use

Figure 5:
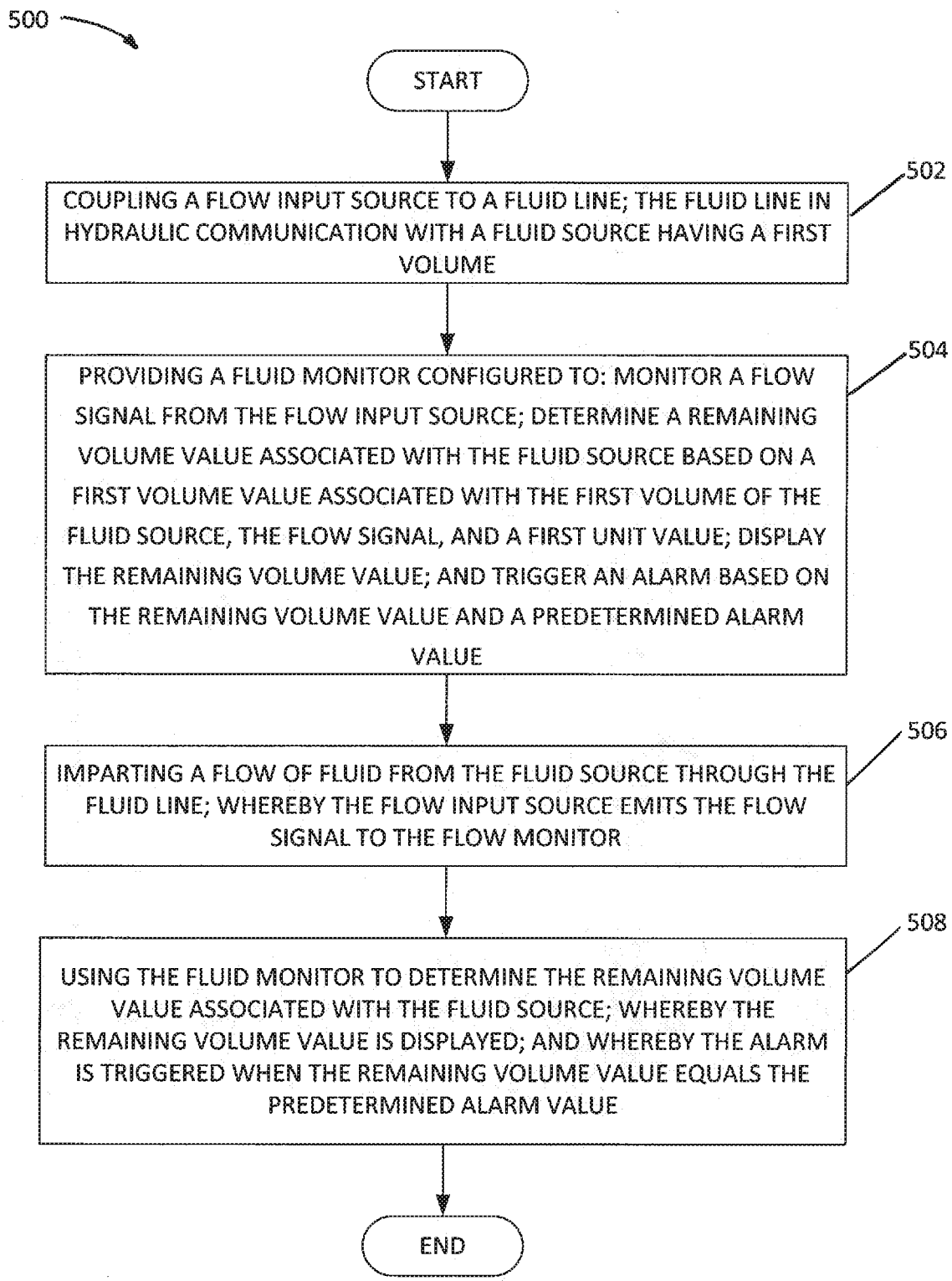
FIG. 5 is a flow chart illustrating a method embodiment of the disclosed subject matter.

In some embodiments and referring to flow chart 500 of FIG. 5, a method of monitoring a fluid source is provided. The method includes, at block 502, coupling a flow input source to a fluid line; the fluid line in hydraulic communication with a fluid source having a first volume. The method further includes, at block 504, providing a fluid monitor configured to: monitor a flow signal from the flow input source; determine a remaining volume value associated with the fluid source based on a first volume value associated with the first volume of the fluid source, the flow signal, and a first unit value; display the remaining volume value; and trigger an alarm based on the remaining volume value and a predetermined alarm value. The method further includes, at block 506, imparting a flow of fluid from the fluid source through the fluid line; whereby the flow input source emits the flow signal to the fluid monitor. The method further includes, at block 508, using the fluid monitor to determine the remaining volume value associated with the fluid source; whereby the remaining volume value is displayed; and whereby the alarm is triggered when the remaining volume value equals the predetermined alarm value. In some embodiments, the predetermined alarm value comprises a low volume value. In some embodiments to alarm comprises at least one of a low alarm and a major alarm; where the low alarm is triggered when the remaining volume value is less than or equal to the low volume value; and wherein the major alarm is triggered when remaining volume value equals zero.

Figure 6:
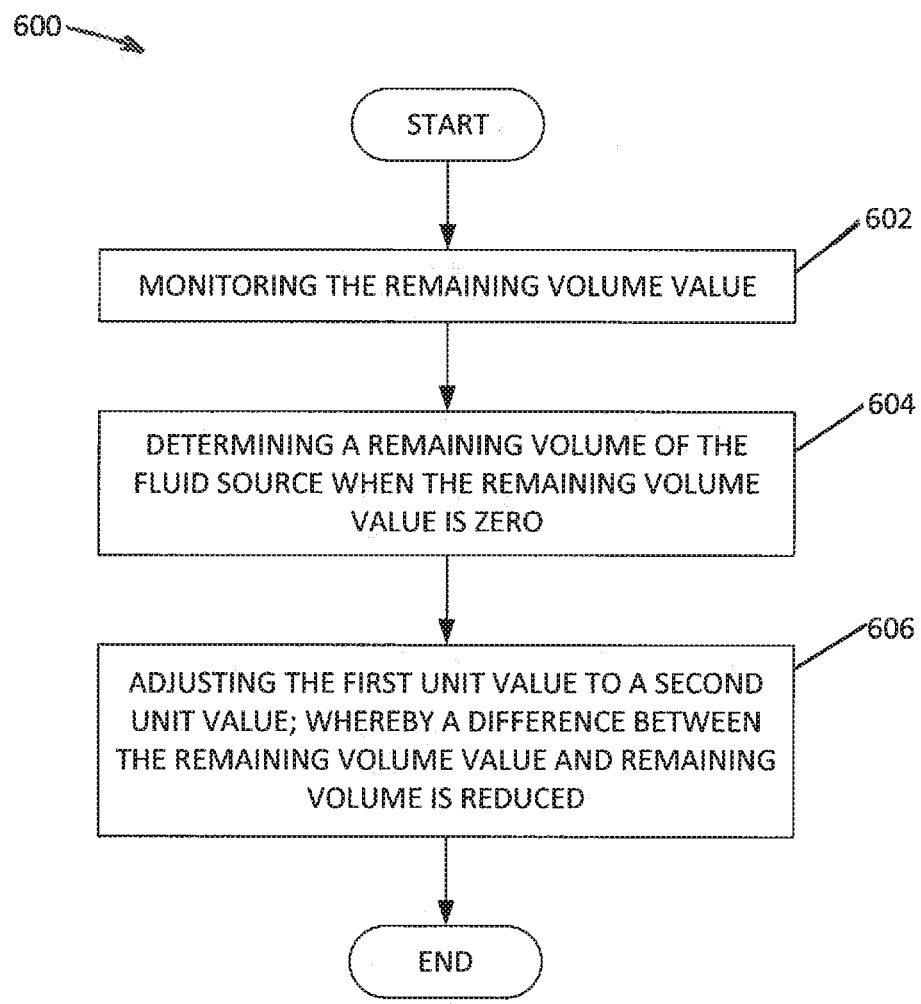
FIG. 6 is a flow chart illustrating a method embodiment of the disclosed subject matter.

In some embodiments and referring to flow chart 600 of FIG. 6, the method of monitoring a fluid source further includes, at block 602, monitoring the remaining volume value. The method further includes, at block 604, determining a remaining volume of the fluid source when the remaining volume value is zero. The method further includes, at block 606, adjusting the first unit value to a second unit value; whereby a difference between the remaining volume value and remaining volume is reduced.

Figure 7:
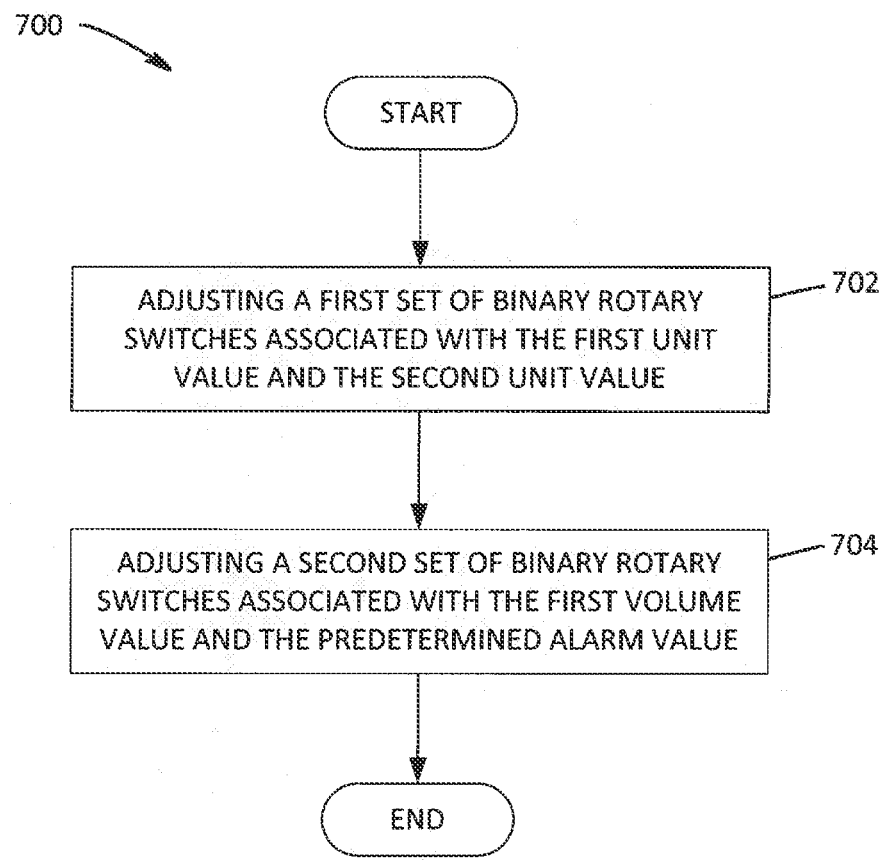
FIG. 7 is a flow chart illustrating a method embodiment of the disclosed subject matter.

In some embodiments and referring to flow chart 700 of FIG. 7, the method of monitoring a fluid source further includes, at block 702, adjusting a first set of binary rotary switches associated with the first unit value and the second unit value. The method further includes, at block 704, adjusting a second set of binary rotary switches associated with the first volume value and the predetermined alarm value.

Figure 8:
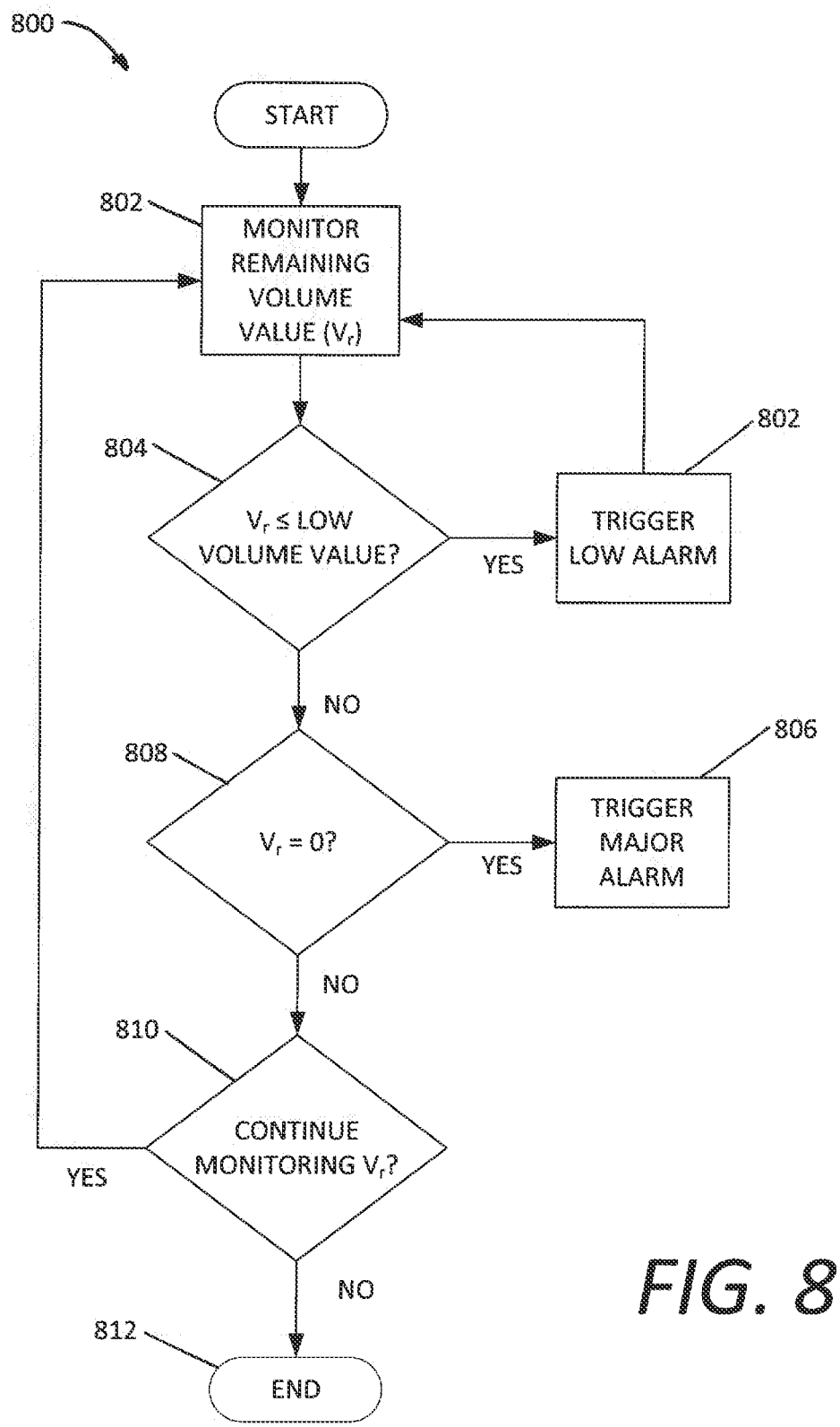
FIG. 8 is a flow chart illustrating a method embodiment of the disclosed subject matter.

In some embodiment and referring to flow chart 800 of FIG. 8, the method of monitoring a fluid source includes, at block 802, monitoring a remaining volume value ($V_r$) as determined by the fluid monitor. The method further includes triggering a low alarm, at block 802, if it is determined the remaining volume value is equal to or less than a low volume value, at block 804. The method further includes triggering a major alarm, at block 806, if the remaining volume value is determined to equal zero, at block 808. The method further includes, at block 810, determining if the remaining volume value should continue to be monitored. If yes, then repeating the monitoring step at block 802. If no, then, at block 812, ending the method of monitoring the remaining volume value.

Although the invention has been disclosed with reference to various particular embodiments, it is understood that equivalents may be employed and substitutions made herein without departing from the scope of the invention as recited in the claims.

It is to be understood that while certain aspects of the disclosed subject matter have been shown and described, the disclosed subject matter is not limited thereto and encompasses various other embodiments and aspects.

Having described the disclosed subject matter, what is claimed as new and desired to be secured by Letters Patent is:

1. A beer keg fluid monitoring system, comprising:
   a flow sensor hydraulically connected to a beer keg via a first fluid line, said flow sensor hydraulically connected to a beer tap via a second fluid line, said flow sensor configured to transmit a first plurality of electrical pulses proportional to a fluid flow rate of a fluid flowing from said beer keg through said flow sensor to said beer tap via said first fluid line and said second fluid line;
   a unit counter in communication with said flow sensor and configured to transmit a unit signal based on said fluid flow rate and a unit value, wherein said unit value is defined as a quantity of said first plurality of electrical pulses transmitted per a predetermined unit of volume of said fluid flowing from said beer keg through said flow sensor to said beer tap;
   a presettable down counter configured to:
      receive the unit signal from the unit counter; and
      determine a remaining volume value of said beer keg based on the unit signal and a first volume value of said beer keg; and
   a display module configured to display the remaining volume value of said beer keg; and
   a first plurality of user-adjustable binary rotary switches configured for the manual adjustment of said unit value by a user of said beer keg fluid monitoring system,
   wherein said beer keg fluid monitoring system does not include, and cannot be connected to, any server, a wireless network, or a smart device.

2. The beer keg fluid monitoring system of claim 1, wherein the unit signal comprises a second plurality of electrical pulses.

3. The beer keg fluid monitoring system of claim 1, further comprising a volume selection module configured to adjust one of the first volume value and a low volume value.

4. The beer keg fluid monitoring system of claim 3, wherein the volume selection module configured to adjust one of said first volume value and said low volume value comprises a second plurality of user-adjustable binary rotary switches.

5. The beer keg fluid monitoring system of claim 1, further comprising an alarm module configured to trigger a low alarm when the remaining volume value is less than a low volume value; the alarm module further configured to trigger a major alarm when the remaining volume value is zero.

6. The beer keg fluid monitoring system of claim 5, wherein each of the low alarm and the major alarm comprising at least one of a light emitting diode and an audio alarm.

7. The beer keg fluid monitoring system of claim 1, wherein the presettable down counter is configured to determine the remaining volume value based on the equation:

$$V_r = V_1 - \left(\frac{P}{U}\right);$$

wherein $V_r$ is the remaining volume value; $V_1$ is the first volume value; P is a number of said first plurality of electrical pulses associated with the flow signal; and U is the unit value.

8. A fluid monitoring system, comprising:
a flow sensor hydraulically connected to a fluid source via a first fluid line, the flow sensor hydraulically connected to a fluid destination via a second fluid line, the flow sensor configured to transmit a plurality of electrical pulses proportional to a fluid flow rate of a fluid flowing from said fluid source through said flow sensor to said fluid destination via said first fluid line and said second fluid line;
a fluid monitor, comprising:
a unit counter in communication with the flow sensor; the unit counter in communication with a first plurality of user-adjustable binary rotary switches; the unit counter configured to:
receive the plurality of electrical pulses from the flow sensor; receive a unit value from the first plurality of user-adjustable binary rotary switches; and transmit a unit signal based on the plurality of electrical pulses and the unit value, wherein said unit value is defined as a quantity of said plurality of electrical pulses transmitted per a predetermined unit of volume of said fluid flowing from said fluid source through said flow sensor to said fluid destination, and wherein said first plurality of user-adjustable binary rotary switches are configured for the manual adjustment of said unit value by a user of said fluid monitoring system;
a presettable down counter in communication with a second plurality of user-adjustable binary rotary switches; the presettable down counter configured to:
receive the unit signal from the unit counter;
receive a first volume value from the second plurality of user-adjustable binary rotary switches; determine a remaining volume value of the fluid based on the unit signal and the first volume value;
transmit a display signal associated with the remaining volume value;
receive a low volume value from the second plurality of user-adjustable binary rotary switches; and
trigger a low alarm when the remaining volume value equals the low volume value;
a display configured to receive the display signal and display the remaining volume value;
an enclosure housing the fluid monitor; and
an uninterrupted power system configured to power the fluid monitor,
wherein said fluid monitoring system does not include, and cannot be connected to, any server, a wireless network, or a smart device.

9. The fluid monitoring system of claim 8, wherein the presettable down counter is configured to trigger a major alarm when the remaining volume value is zero.

10. The fluid monitor of claim 8, wherein the presettable down counter is configured to determine the remaining volume value based on the equation:

$$V_r = V_1 - \left(\frac{P}{U}\right);$$

wherein $V_r$ is the remaining volume value; $V_1$ is the first volume value; P is a number of said plurality of electrical pulses associated with the flow signal; and U is the unit value.

11. A fluid monitoring system, comprising:
a control panel having a power source;
a plurality of fluid monitors connected to the control panel; wherein each of the plurality of fluid monitors configured to receive one of a plurality of flow signals from one of a plurality of flow sensors;
wherein each of said one of plurality of flow sensors is hydraulically connected to a respective fluid source via a respective first fluid line, wherein each of said one of plurality of flow sensors is hydraulically connected to a respective fluid destination via a respective second fluid line, wherein each of said one of plurality of flow sensors is configured to transmit a plurality of electrical pulses proportional to a respective fluid flow rate of a respective fluid flowing from said respective fluid source through said respective flow sensor to said respective fluid destination via said respective first fluid line and said respective second fluid line;
each of the plurality of fluid monitors comprising:
a unit counter configured to transmit a unit signal based on one of the plurality of flow signals and a unit value, wherein said unit value is defined as a quantity of said plurality of electrical pulses transmitted per a predetermined unit of volume of said fluid flowing from said fluid source through said flow sensor to said fluid destination;
a presettable down counter configured to:
receive the unit signal from the unit counter; and
determine a remaining volume value based on the unit signal and a first volume value;
a display module configured to display the remaining volume value;
a blanking logic module configured to control power consumption of the plurality of fluid monitors; and a plurality of user-adjustable binary rotary switches each in communication with a respective one of said plurality of fluid monitors and configured for the manual adjustment of a respective said unit value by a user of said fluid monitoring system, wherein said fluid monitoring system does not include, and cannot be connected to, any server, a wireless network, or a smart device.

12. The fluid monitoring system of claim 11, further comprising an alarm logic module responsive to at least one of a plurality of alarms associated with the plurality of fluid monitors.

13. The fluid monitoring system of claim 11, wherein the power source comprises an uninterrupted power supply.

14. The fluid monitoring system of claim 11, further comprising a plurality of flow sensors; wherein each of the plurality of flow sensors is configured to communicate a flow signal to the unit counter of the one of a plurality of fluid monitors.

15. A method of monitoring a fluid source, comprising the steps of:
coupling a flow sensor to said fluid source via a first fluid line; coupling said flow sensor to a fluid destination via a second fluid line; the fluid source having a first volume;
providing a fluid monitor configured to:
monitor a flow signal transmitted from said flow sensor, said flow signal comprising a plurality of electrical pulses proportional to a fluid flow rate of a fluid flowing from said fluid source through said flow sensor to said fluid destination via said first fluid line and said second fluid line;
determine a remaining volume value associated with the fluid source based on a first volume value associated with a first volume of the fluid source, the flow signal, and a first unit value, wherein said first unit value is defined as a quantity of said plurality of electrical pulses per a predetermined unit of volume of said fluid flowing from said fluid source through said flow sensor to said fluid destination;
display the remaining volume value;
trigger an alarm based on the remaining volume value and a predetermined alarm value;
imparting a flow of fluid from the fluid source through the first fluid line;
whereby the flow sensor transmits the flow signal to the fluid monitor; and
using the fluid monitor to determine the remaining volume value associated with the fluid source; and
providing a first plurality of user-adjustable binary rotary switches in communication with said fluid monitor and configured for the manual adjustment of said first unit value by a user of said fluid monitor,
wherein said fluid monitor does not include, and cannot be connected to, any server, a wireless network, or a smart device,
whereby the remaining volume value is displayed; and
whereby the alarm is triggered when the remaining volume value equals the predetermined alarm value.

16. The method of claim 15, further comprising the steps of: monitoring the remaining volume value; determining a remaining volume of the fluid source when the remaining volume value is zero; and adjusting the first unit value to a second unit value;
whereby a difference between the remaining volume value and the remaining volume is reduced.

17. The method of claim 16, further comprising the steps of:
adjusting said first plurality of user-adjustable binary rotary switches associated with the first unit value and the second unit value; and
adjusting a second plurality of user-adjustable binary rotary switches associated with the first volume value and the predetermined alarm value.

18. The method of claim 15, wherein the alarm comprises at least one of a low alarm and a major alarm.

\* \* \* \* \*